June 3, 1958  D. H. MacDONALD ET AL  2,837,620
STRAIN GAUGES AND LOAD WEIGHING CELLS
Filed April 12, 1956
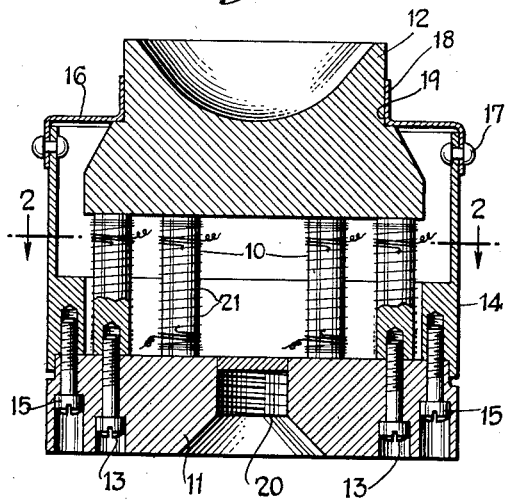
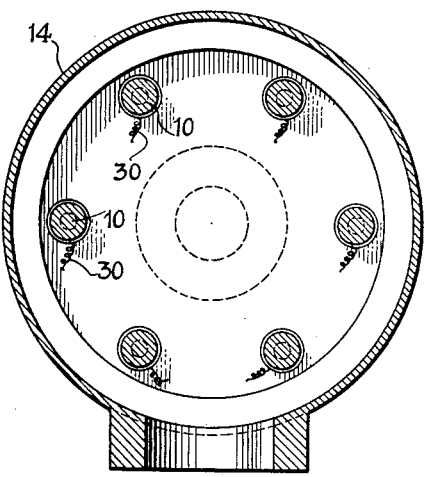
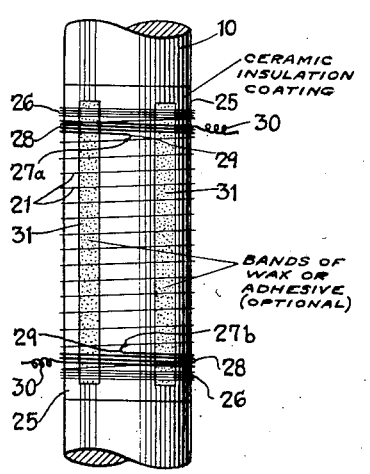
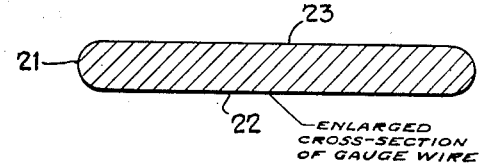
INVENTORS
DENNISON H. MAC DONALD
BY THOMAS S HARRIS, JR.
ATTORNEYS

United States Patent Office 2,837,620
Patented June 3, 1958

2,837,620

STRAIN GAUGES AND LOAD WEIGHING CELLS

Dennison H. MacDonald, East Haven, and Thomas S. Harris, Jr., Wallingford, Conn., assignors to Revere Corporation of America, Wallingford, Conn., a corporation of New Jersey Application April 12, 1956, Serial No. 577,726

8 Claims. (Cl. 201—63)

This invention relates to strain gauges as well as load weighing cells and the like in which such gauges are adapted to be embodied.

One of the types of strain gauges presently most widely used comprises a wire or filament of electrical resistance material arranged generally in a zig-zag formation and bonded throughout its effective length to a layer or sheet of suitable insulating material, which in turn is adapted to be bonded to a column for example, or other load receiving element, the load upon which element is to be measured by way of measuring the varying resistance of such filament arising from changes in its cross-section occurring when such element is stressed. While with such type of strain gauge, quite accurate load measurements may be dependably made, yet the manufacture of such gauges, if they are to be accurate, uniform and dependable, is a somewhat intricate process requiring skilled and experienced workmanship so that despite their simplicity, such gauges are quite expensive. Also the step of properly and dependably bonding same to the load receiving element on which they are to be used usually involves another source of expense for skilled workmanship. Furthermore, such gauges if initially made to conform to a flat plane, are not well adapted for bonding to columns of circular cross-section or other elements having curved surfaces or cross-sections of various diameters.

In efforts to avoid these difficulties, proposals have from time to time been made to form resistance filament type strain gauges by helically winding the resistance wire or filament about a column means or other load-receiving element. While this expedient, of course, avoids the necessity and consequent expense of preforming the gauge means before it is applied to the load-receiving element and also enables the gauge to be readily wrapped about any size of load-receiving element, yet so far as is known, such helically wrapped gauges have not heretofore been found sufficiently accurate and dependable in operation to be used commercially to any great extent.

Such gauges in the form of a filament helically wrapped about a column operate because of the Poisson effect, that is, as a column for example carrying same is subjected to a compression load, the cross-sectional area of the column will expand substantially in accordance with Poisson's ratio with the result that the helical turns tend to be stretched and thus reduced in cross-section with a consequent increase of resistance, which increase may be readily measured to give measurements of the varying loads to which the column is subjected. But if such wrapped turns of resistance wire are held in place by bonding same to the load receiving element, problems comparable to those with other bonded strain gauges may arise in securing a uniform durable product. Also the problem arises of so attaching the ends of such a filamentary winding that the effective length of the filament and the degree of strain in the end portions of the gauge when in use will not vary unpredictably. Also one of the difficulties of such helically wrapped gauges is believed to have been that of properly insulating the filament without interfering with its action. Also, a helically wrapped wire on a smooth surfaced column will engage such surface tangentially of the circular cross-section of the wire, but as the wire becomes tensioned or stretched due to expansion of the column under loads, such tangential contact may tend to vary in width unpredictably and the cross-section of the wire may also become distorted unpredictably.

In accordance with the present invention, however, a strain gauge construction is provided in the form of a filament of electrical resistance wire surrounding or embracing a load receiving element and the above-noted difficulties which such constructions have heretofore involved are avoided by a combination of expedients, viz. the wire or filament is formed of a flat or sufficiently flattened cross-section so that it will engage the load receiving element along a narrow band such that normally the area of contact and the cross-sectional shape of the wire do not vary materially or unpredictably. And in order to provide a reliable permanent insulating means for the wire on the load receiving element, the latter is preferably covered with a hard permanent ceramic coating. Furthermore, in order that the effective length of the gauge in use and the degree of strain in its effective end portions will not vary unpredictably, the turns are preferably secured at their ends to the load receiving element by mechanical means located beyond the points at which the electrical terminals are connected. That is, the effective portion of the filament which is actively used and which may comprise one or a plurality of wrapped turns, extends from one electrical connection to the other, but the mechanical connections for holding the wrapped turns in position under tension are located beyond such electrical connections so that any variations in the unpredictable tensions in such mechanical attachments will be in parts of the wire which are electrically inactive.

Various further and more specific objects, features and advantages of the invention will appear from the description given below taken in connection with the accompanying drawings illustrating by way of example preferred forms of the invention.

In the drawings:

Fig. 1 is a vertical sectional view through a cell for weighing purposes and the like and which embodies the invention in one of its preferred forms;

Fig. 2 is a horizontal view taken substantially along line 2—2 of Fig. 1;

Fig. 3 is an elevational view of a portion of a column means with a helically wrapped strain gauge means thereon in accordance with the invention; and Fig. 4 is a cross-sectional view greatly enlarged showing the flattened strain gauge wire used in accordance with a preferred aspect of the invention.

The type of multi-column cell shown in Figs. 1 and 2 is similar in general arrangement to certain of those of U. S. Patent to Thurston, No. 2,488,349, dated November 15, 1949, and such form is illustrated here by way of example, although it will be understood that the invention may be embodied in other types of cells, for instance cells of a single column type such as shown in the co-pending U. S. patent application of Dennison H. MacDonald, Serial No. 566,165, filed Feb. 17, 1956. Certain aspects of the invention may also be embodied in assemblies having columns of fused quartz in lieu of steel as disclosed in the co-pending U. S. patent application of Arthur L. Thurston, Serial No. 563,586, filed February 6, 1956.

In the construction as shown in Figs. 1 and 2, a plurality of cylindrical steel columns as at 10 are shown interposed between a metal base member 11 and a metal load-receiving socket means as at 12. Each of the columns may be secured to the base as for example by screws 13. The cell may be enclosed in a relatively rigid cylindrical casing as at 14 also retained to the base as by screws 15. The casing as further disclosed in said Thurston patent may have a closure means comprising a relatively thin resilient annular member 16 having a peripheral flange retained as by rivets 17 to the walls of the casing and having an internal flange as at 18 embracing the member 12 at a recessed portion 19 on the latter.

The base 11 may be formed with a threaded aperture as at 20 for mounting the cell on a jack or the like.

Each of the columns 10 has applied thereto a length of electrical resistance filament or wire preferably in the form of several turns as at 21 helically wound in place under tension sufficient to prevent any easy sidewise displacement of the turns and also sufficient to insure that no part of the turns during normal use of the device will ever embody slack portions.

The surface of the wire or filament which bears against the column, as above noted, is preferably flattened as shown at 22 in the enlarged cross-sectional view of Fig 4. In a typical case, resistance wire may be used which initially has a diameter of two thousandths of an inch for example. This is flattened to a thickness of about 0.0005 inch and a width of about 0.004 inch for example. The opposite or outside wire surface need not necessarily be flattened, although the surface 22 may easily be made to assume the desired flattened condition by passing the wire through a nip between a pair of rollers which may also cause flattening of the other surface as indicated at 23. It will be understood that the wire might, if desired, also be of a rectangular or square cross-section in order to provide a flattened surface bearing against the column, but usually the cross-sectional configuration having the rounded sides as of Fig. 4 will be preferred.

If the columns are to be made of quartz or other permanent satisfactory insulation material, there of course need be no other insulation material of the columns themselves. However, if the columns, for reasons of strength and economy, are to be made of steel or other metal, then the surfaces thereof which are to bear the helical winding, are first coated preferably with a hard permanent coating of a suitable ceramic insulating material as indicated at 25 in Fig. 3. The ceramic material used may comprise any of the commonly available ceramic materials such as glass or such as are used and applied under fusion to form so-called "porcelain" like surfaces on steel. Such material if not originally applied in a form so as to present a smooth regular surface to the wire, may be ground so that it will present such a regular smooth surface, provided the material is one which will not then become objectionably porous with deficient insulating qualities.

At its ends, the winding 21 may be bound in place by winding under tension several turns side by side, or one over the other as at 26, these turns being soldered together. They may, if desired, be further secured against displacement on the insulation thereunder by the use of any suitable permanent plastic adhesive, but this will not ordinarily be necessary.

The electrical connections of each winding 21 are preferably made at points such as indicated at 27a, 27b respectively, that is, at points spaced inwardly somewhat from the mechanically or otherwise affixed end portions of the wire. If the electrical terminals are for example soldered to the winding at these points, this will insure that the active portion of the strain gauge means will be the portion of the winding between such points and exclusive of the bound or affixed end portions of the wire. Thus any unpredictable variations of tensions in the affixed end portions of the wire which may occur under varying loads applied to the cell will have no appreciable electrical effect on the active portion of the strain gauge wire. However, the electrical connection wires as applied at points 27a and 27b should be suitably fixed in place whereby same will not at any time tend to apply any tension or other forces to the gauge wire 21 at these points. A preferred method for overcoming this problem is to wind under tension about the column several turns of the connection wire as indicated at 28, these turns being wound on after the gauge wire 21 is in place and preferably although not necessarily, being wound in the opposite direction. The wire of the turns 28 is preferably of a larger diameter than the gauge wire 21. For example, wire of a diameter of five-thousandths of an inch may be used. The turns 28, after being thus applied, are soldered together and the end portion 29 of the inner turn is then pulled away from the other portions of turns 28 and curled back to the point of soldering as at 27a or 27b. The other ends as at 30 of these turns 28 run to the output terminals for the device which are connected to suitable resistance measuring apparatus, such as a Wheatstone bridge arrangement as disclosed in the above-mentioned Thurston patent.

It will be understood that the term "soldered" as used herein, is intended to include processes such as welding, brazing and the like.

If desired, in order to prevent tampering with the winding 21 or to afford protection thereto against accidental scratches or the like, same may be covered with any suitable adhesive or wax coating or partially covered as by bands or strips thereof as indicated at 31 in Fig. 3. The strain gauge column means and cells above described and referred to may be used for weighing loads and the like in a manner which will be apparent from the disclosures of the above-mentioned Thurston patent. It will be understood that column means as of Fig. 3 may be used to measure tension loads as well as compression loads applied to the column ends.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Strain gauge means comprising in combination: a load bearing element; and a length of electrical resistance filament wrapped and retained under tension upon said element, the surface of such filament which presses against such element being insulated therefrom and being flattened whereby pressure of the filament against the element is distributed along a band of substantial width.

2. Strain gauge means comprising in combination: a load bearing element; and a length of electrical resistance wire wrapped and retained under tension upon said element, the surface of such wire which presses against such element being insulated therefrom by a thin layer of ceramic material and such wire surface being flattened whereby pressure of the wire against the element is distributed along a band of substantial width.

3. Strain gauge means comprising in combination: a load bearing element; a length of electrical resistance wire wrapped as a helix under tension about said element; means substantially at the ends of such helix for affixing same under such tension in respect to said element; and electrical connections to said wire at points spaced inwardly substantially from such affixed ends, the surface of such wire which presses against such element being insulated therefrom and being flattened whereby pressure of the wire against the element is distributed along a band of substantial width.

4. Strain gauge means comprising in combination: a load bearing element formed with a portion of cylindrical cross-section embraced by at least one turn of electrical resistance wire, the end portions of same being secured to said element, and electrical connections thereto being provided by attachment of connection wires thereto at points spaced inwardly from the points of securement of said end portions, and whereby the electrically effective gauge portion of the wire does not include such points of securement.

5. Strain gauge means comprising in combination: a load bearing element formed with a portion of generally rounded cross-section, coated with ceramic insulating material and embraced by at least one turn of electrical resistance filament, the end portions of same being secured to said element, and electrical connections thereto being provided by attachment of connection wires thereto at points spaced inwardly from the points of securement of said end portions, and whereby the electrically effective gauge portion of the filament does not include such points of securement.

6. Strain gauge means comprising in combination: a load-bearing element; a plurality of turns of electrical resistance filament wrapped under tension about said element; and a pair of connection wires for said element, each of said wires including a plurality of turns wrapped about the load-bearing element and secured together, the latter turns embracing one or more of the filament turns near the end turns of the filament, one end portion of each of said wires diverging away from the adjacent secured portions thereof and being connected to a point on said filament spaced inwardly of the wire turns and whereby an electrically effective gauge portion of the filament extends from such point of connection of one wire to the corresponding point of connection of the other wire, the effective gauge portion of the filament thus being exclusive of the end portions thereof and of the portions thereof embraced by the wires.

7. Strain gauge means comprising in combination: a load bearing element; a plurality of turns of electrical resistance filament wrapped generally helically under tension about said element, the turns being in spaced relation except at the end portions where a plurality thereof are wrapped in proximity to each other and soldered together; a pair of connection wires for said element, each of said wires including a plurality of turns wrapped about the load bearing element and soldered together, the latter turns embracing one or more of the filament turns near the end turns of the filament, one end portion of each of said wires diverging away from the adjacent soldered portions thereof and being soldered to a point on said filament spaced inwardly of the soldered filament and wire turns and whereby an electrically effective gauge portion of the filament extends from such point of connection of one wire to the point of connection of the other wire, the effective gauge portion of the filament thus being exclusive of the end portions thereof and of the portions thereof embraced by the wires.

8. Strain gauge means comprising in combination: a load-bearing element; a plurality of turns of electrical resistance filament wrapped generally helically under tension about said element, the turns being in spaced relation except at the end portions where a plurality thereof are wrapped in proximity to each other and secured together; and a pair of connections for said element, each of said connections including portions embracing the load bearing element, a portion of each of said connections being soldered to a point on said filament spaced inwardly of said filament end portions which are wrapped in proximity of each other and whereby an electrically effective gauge portion of the filament extends from one such soldered point to the corresponding soldered point for the other connection, the effective gauge portion of the filament thus being exclusive of said end portions thereof.

References Cited in the file of this patent

UNITED STATES PATENTS

| | | | |
|---|---|---|---|
| Re. 22,589 | Ruge | Jan. 9, | 1945 |
| 508,643 | Southworth | Nov. 14, | 1893 |
| 749,204 | Kuch | Jan. 12, | 1904 |
| 803,795 | Stevens | Nov. 7, | 1905 |
| 1,401,477 | Kebler | Dec. 27, | 1921 |
| 1,975,623 | Siegel | Oct. 2, | 1934 |
| 2,365,015 | Simmons | Dec. 12, | 1944 |
| 2,493,029 | Ramberg | Jan. 3, | 1950 |
| 2,569,499 | Shoub | Oct. 2, | 1951 |
| 2,729,730 | Brady | Jan. 3, | 1956 |
| 2,813,958 | MacDonald | Nov. 19, | 1957 |

FOREIGN PATENTS

| | | | |
|---|---|---|---|
| 610,800 | Great Britain | Oct. 20, | 1948 |

OTHER REFERENCES

The Review of Scientific Instruments, vol. 26, No. 9, September 1955, pages 879–883.

The Review of Scientific Instruments, May 1947, pages 291–293.